США006279952B1

(12) United States Patent
Van Wynsberghe et al.

(10) Patent No.: US 6,279,952 B1
(45) Date of Patent: Aug. 28, 2001

(54) ADAPTIVE COLLAPSIBLE STEERING COLUMN

(75) Inventors: Roy D. Van Wynsberghe; Kevin M. Brown, both of Mesa; Vincent J. Mramor, Chandler; Bryan W. Shirk, Mesa; Timothy A. Swann, Mesa; Eric C. Erike, Mesa, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/483,323

(22) Filed: Jan. 14, 2000

(51) Int. Cl.[7] ........................................... B62D 1/19
(52) U.S. Cl. ..................... 280/777; 280/782; 280/784; 74/492
(58) Field of Search ................................ 280/777, 782, 280/784; 74/492

(56) References Cited

U.S. PATENT DOCUMENTS

| | | | |
|---|---|---|---|
| 3,656,366 | * 4/1972 | Somero | 74/492 |
| 3,744,338 | * 7/1973 | Komatsu et al. | 74/492 |
| 3,831,998 | * 8/1974 | Hewitt | 296/35.2 |
| 4,019,403 | * 4/1977 | Kondo et al. | 74/492 |
| 4,255,986 | * 3/1981 | Mukoyama | 74/492 |
| 4,643,448 | * 2/1987 | Loren | 280/777 |
| 4,886,295 | 12/1989 | Browne . | |
| 4,995,486 | * 2/1991 | Garneweidner | 188/374 |
| 5,035,307 | * 7/1991 | Sadeghi et al. | 188/372 |
| 5,167,850 | 12/1992 | Shtarkman . | |
| 5,176,368 | 1/1993 | Shtarkman . | |
| 5,242,195 | * 9/1993 | Wendling | 280/777 |
| 5,293,968 | * 3/1994 | Schuelke et al. | 188/282 |
| 5,517,096 | * 5/1996 | Shtarkman et al. | 318/434 |
| 5,618,058 | * 4/1997 | Byon | 280/777 |
| 5,655,757 | 8/1997 | Starkovich et al. . | |
| 5,870,930 | * 2/1999 | Willett et al. | 74/492 |
| 5,893,580 | * 4/1999 | Hoagland et al. | 280/731 |
| 6,116,648 | * 9/2000 | Holly et al. | 280/777 |

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

An apparatus for supporting a steering wheel (22) of a vehicle (10) comprises a first steering column part (32), a second steering column part (34), and supporting structure (46) supporting the first steering column part and the vehicle steering wheel for movement relative to the second steering column part. An energy absorbing device (20) is interposed between the first steering column part (32) and the second steering column part (34) for resisting movement of the first part relative to the second part. The energy absorbing device (20) comprises a fluid (50) having a viscosity which varies in response to an energy field acting on the fluid. The energy absorbing device (20) also comprises at least one orifice (76) through which the fluid (50) flows upon movement of the first part (32) relative to the second part (34). The energy absorbing device (20) further comprises means (54, 60, 80, 84) for varying the viscosity of the fluid to vary the rate of fluid flow through the orifice and thereby to vary the resistance to movement of the first steering column part relative to the second steering column part.

16 Claims, 2 Drawing Sheets

ADAPTIVE COLLAPSIBLE STEERING COLUMN

BACKGROUND OF THE INVENTION

1. Technical Field

The present invention relates to an energy absorbing device for a collapsible steering column in which the resistance to collapsing can be varied.

2. Description of the Prior Art

U.S. Pat. No. 4,886,295 describes a vehicle occupant protection system including a collapsible steering column. An energy absorber is located between two relatively movable sections of the steering column. The energy absorber includes an inflatable bag. The vehicle has electric circuitry, including sensors for sensing vehicle and occupant conditions, that controls the state of inflation of the inflatable bag to vary the energy absorbing capacity of the steering column.

It is known to use electrorheological fluid in an energy absorber for an engine mount or another structure having two relatively movable parts. Typical structures incorporating such a fluid are disclosed in U.S. Pat. Nos. 5,176,368 and 5,655,757. Varying the strength of an energy field acting on the fluid can vary the apparent viscosity of the fluid, thus controlling the energy absorption characteristics of the structures.

SUMMARY OF THE INVENTION

The present invention is an apparatus for supporting a steering wheel of a vehicle. The apparatus comprises a first steering column part, a second steering column part, and supporting structure supporting the first steering column part and the vehicle steering wheel for movement relative to the second steering column part. An energy absorbing device is interposed between the first steering column part and the second steering column part for resisting movement of the first part relative to the second part. The energy absorbing device comprises a fluid having a viscosity which varies in response to an energy field acting on the fluid. The energy absorbing device also comprises at least one orifice through which the fluid flows upon movement of the first part relative to the second part. The energy absorbing device further comprises means for varying the viscosity of the fluid to vary the rate of flow of the fluid through the at least one orifice and thereby to vary the resistance to movement of the first steering column part relative to the second steering column part.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF EMBODIMENTS OF THE INVENTION

Figure 1:
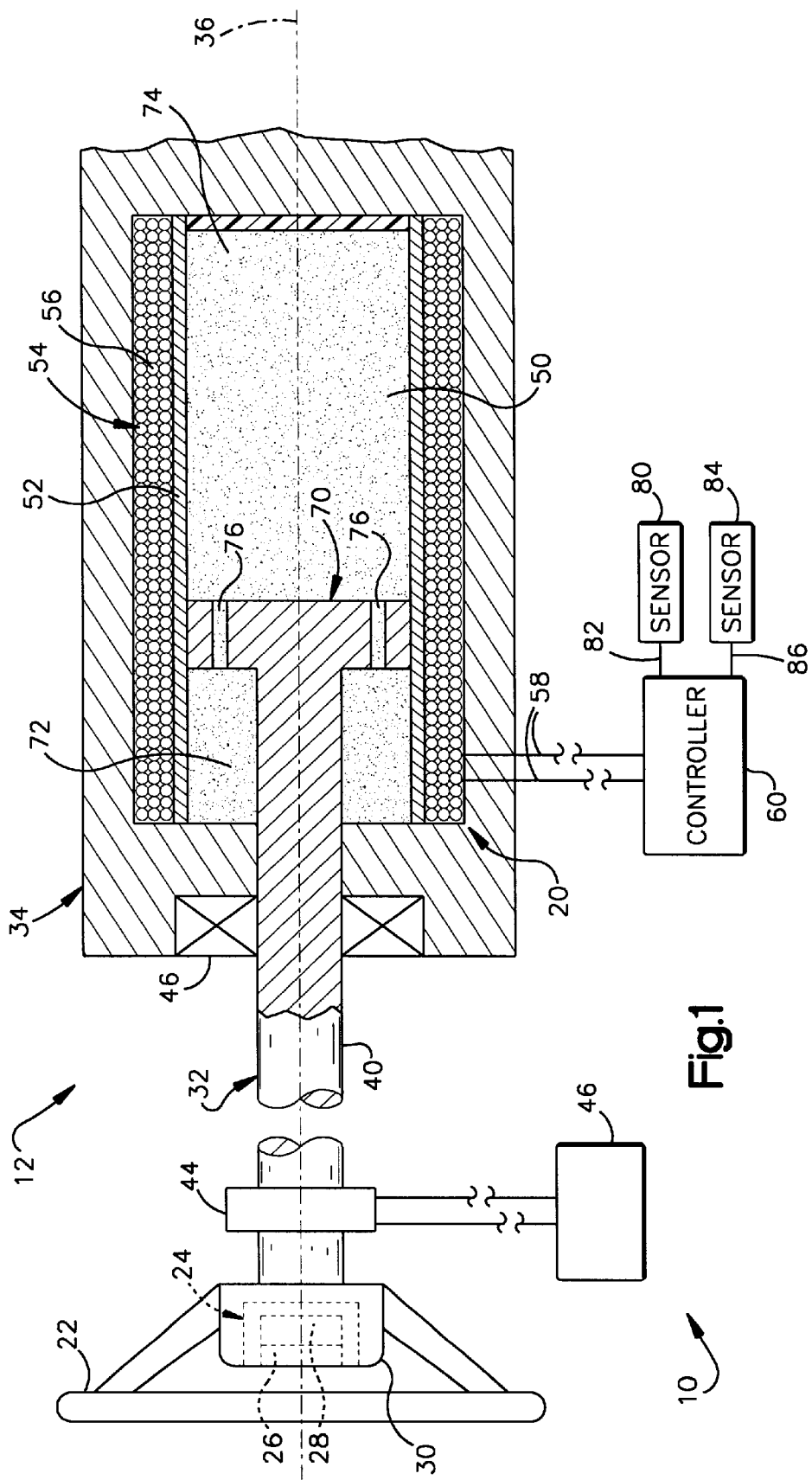
FIG. 1 is a schematic illustration of an apparatus including an energy absorbing device constructed in accordance with a first embodiment of the present invention.

The present invention relates to an energy absorbing device for a collapsible steering column in which the resistance to collapsing under load can be varied. As representative of the present invention, FIG. 1 illustrates schematically a portion of a vehicle 10 that includes a steering column 12. The steering column 12 is a collapsible steering column that incorporates an energy absorbing device 20 in accordance with the invention.

The vehicle 10 includes a steering wheel 22 for effecting directional control of the vehicle. An air bag module 24 is mounted on the steering wheel 22. The air bag module 24 includes an air bag 26 and an inflator 28 within a cover 30. The cover 30 is adapted to open easily upon inflation of the air bag 26.

The steering wheel 22 is supported on the steering column 12 of the vehicle 10. The steering column 12 includes a first steering column part 32 that is movable relative to a second steering column part 34 along an axis 36 of the steering column.

The first steering column part 32 includes a cylindrical shaft 40 centered on the axis 36. The steering wheel 22 is supported on the shaft 40 for rotation with the shaft. The second steering column part 34, only a portion of which is shown, is fixed to the vehicle structure. One or more bearings, and/or other structure, indicated schematically at 46, support the first steering column part 32 for movement relative to the second steering column part 34.

The shaft 40 rotates upon rotation of the steering wheel 22. The steering system of the vehicle 10 is a "drive by wire" electric steering system. Thus, the vehicle 10 includes electric circuitry indicated schematically at 44, such as a position sensor associated with the first steering column part 32, for effecting steering movement of the vehicle through an electric steer system indicated schematically at 46.

The energy absorbing device 20 is interposed between the first steering column part 32 and the second steering column part 34. The energy absorbing device 20 helps to control movement of the first steering column part 32 relative to the second steering column part 34 in a direction along the axis 36.

The energy absorbing device 20 includes a quantity of fluid 50. The fluid 50 is a fluid of which the viscosity can be varied by applying an energy field to the fluid. The fluid 50 is preferably a magneto-rheological fluid, the viscosity of which can be varied by controlling the strength of a magnetic field applied to the fluid. The fluid 50 can, alternatively, be an electrorheological fluid, the viscosity of which can be varied by controlling the strength of an electric field applied to the fluid.

The fluid 50 is contained in a fluid cylinder 52 fixed to the second part 34 of the steering column 12. The fluid cylinder 52 is enclosed in the second part 34 of the steering column 12 and is centered on the axis 36.

The energy absorbing device 20 also includes a coil 54 that has a plurality of windings 56. The windings 56 extend around the fluid cylinder 52. The windings 56, when energized by an electric current over lead wires 58, generate a magnetic field which extends through and acts on the fluid 50. The lead wires 58 are connected to a controller 60, such as a microprocessor, described below in more detail.

A piston 70 is located in the cylinder 52. The piston 70 is fixed on the end of the shaft 40 opposite the steering wheel 22. The piston 70 is slidable in the cylinder 52 and divides the cylinder into an upper portion 72 and a lower portion 74. A plurality of openings in the form of orifices 76 are formed in the piston 70. The orifices 76 establish fluid communication through the piston 70 between the upper cylinder portion 72 and the lower cylinder portion 74.

The fluid 50 resists axial sliding movement of the piston 70 in the cylinder 52. If the viscosity of the fluid 50 is low enough, the fluid in the cylinder 52 can flow through the orifices 76 in the piston 70, to enable the piston to move axially in the cylinder through the body of fluid. If the viscosity of the fluid 50 is high enough, the fluid in the cylinder 52 can not flow through the orifices 76 in the piston 70, thereby blocking sliding movement of the piston in the cylinder. Varying the viscosity of the fluid 50 thus varies the rate of flow of the fluid through the orifices 76 in the piston 70, thereby varying the resistance to movement of the piston, and the first steering column part 32, relative to the second steering column part 34.

The vehicle 10 includes one or more occupant condition sensors indicated schematically at 80. The occupant condition sensors 80 may be any of several known types. The occupant condition sensors 80 are operative to sense the position of the driver relative to the steering wheel 22, or the size or weight of the driver, and to provide an appropriate output signal over lead wires 82.

The vehicle 10 also includes one or more vehicle condition sensors 84. The vehicle condition sensors 84 may be any of several known types. For example, one of the vehicle condition sensors 84 may be a deceleration sensor such as a mechanical inertia switch or an electrical accelerometer. The vehicle condition sensors 84 provide an appropriate output signal over lead wires 86. The controller 60 is operatively connected by the lead wires 82 and 86 to the occupant condition sensors 80 and to the vehicle condition sensors 84.

The controller 60 is also electrically connected to the air bag inflator 28. The controller 60 incorporates one of several crash algorithms known in the art for discriminating between deployment and non-deployment crash conditions and, in response, determining whether to deploy the air bag 26. In the event of a crash condition involving sudden vehicle deceleration or other event for which protection of the vehicle occupant may be desired, the sensors 80 and 84 provide appropriate output signals that are inputs to the controller 60. The controller 60 compares the outputs of the sensors 80 and 84 with outputs found in a look-up table, for example. Depending on the outcome of this comparison, the controller 60 determines whether or not to actuate the inflator 28 and deploy the air bag 26.

The controller 60 also controls the operation of the energy absorbing device 20 in response to the outputs of the vehicle condition sensors 84 and the occupant condition sensors 80. Control of the energy absorbing device 20 may be responsive to the vehicle crash severity as sensed by the vehicle condition sensors 84. It may also be responsive to the size, weight, and/or position of the driver, or to any other factor which may be useful in determining how much resistance the steering column 12 should offer under load.

The controller 60 normally energizes the coil 54 so as to keep the viscosity of the fluid 50 high. The high viscosity of the fluid 50 resists flow of the fluid through the orifices 76 in the piston 70. This resistance to flow prevents the piston 70 from moving in the cylinder 52, and thus prevents the first steering column part 32 from moving axially relative to the second steering column part 34.

In the event of a crash condition involving sudden vehicle deceleration, or other event for which protection of the vehicle occupant may be desired, the sensors 80 and 84 provide appropriate output signals. The output signals are inputs to the controller 60 for the purpose of adjusting the viscosity of the fluid 50. The controller 60 determines, on the basis of these output signals, whether the preset viscosity of the fluid 50 is appropriate for the sensed vehicle conditions and occupant conditions. The controller 60 compares the outputs of the sensors 80 and 84 with outputs found in a look-up table, for example. Depending on the outcome of this comparison, the controller 60 determines whether or not to adjust the preset viscosity of the fluid 50.

In most, if not all, crash conditions, it is desirable that the steering column 12 be collapsible under driver load. It is also desirable that as much as possible of the stroke of the steering column 12 be used to absorb the kinetic energy of the driver. Thus, the controller 60 preferably adjusts the viscosity of the fluid 50 to meet this goal.

For example, in the event of a sensed crash condition of relatively low severity, the driver will have a relatively low amount of kinetic energy to be absorbed by the energy absorbing device 20. Therefore, the steering column 12 can resist in a relatively weak manner the driver's forward movement, and still absorb most or all of the kinetic energy of the driver. To achieve this result, the controller 60 can cause the strength of the magnetic field generated by the coil 54 to be decreased substantially. This decrease in the magnetic field strength lowers the viscosity of the fluid 50 substantially, and thus decreases substantially the resistance to collapsing of the steering column 12 under load applied by the driver's body.

Alternatively, in the event of a sensed crash condition of relatively high severity, the driver will have a relatively large amount of kinetic energy to be absorbed by the energy absorbing device 20. Therefore, the steering column 12 needs to resist in a relatively strong manner the driver's forward movement, in order to absorb most or all of the kinetic energy of the driver during the stroke of the steering column. To achieve this result, the controller 60 can cause the strength of the magnetic field generated by the coil 54 to be decreased by a relatively small amount. This relatively small decrease in the magnetic field strength causes the fluid 50 to decrease in viscosity by a relatively small amount, and thus decreases by only a small amount the resistance to collapsing of the steering column 12 under load applied by the driver's body. The steering column 12 collapses but does so with a relatively strong resistance, thus absorbing more kinetic energy of the driver.

As another example, the controller 60 determines at the onset of the crash event whether to change the preset condition of the fluid 50 on the basis of sensed occupant conditions. For example, if the driver is relatively close to the steering wheel 22 at the onset of the crash event, the controller 60 can in response decrease the strength of the magnetic field generated by the coil 54. This causes the fluid 50 to decrease in viscosity, making it easier for the piston 70 to move axially through the fluid 50 in the cylinder 52. This decreases the resistance to collapsing of the steering column 12 under driver load. Similarly, if the occupant condition sensors 80 indicate that the driver is relatively far from the steering wheel 22 at the onset of the crash condition, then the controller 60 can increase the strength of the magnetic field generated by the coil 54. The increased magnetic field will increase the resistance to collapsing of the steering column 12 under driver load.

Vehicle and occupant conditions can change during the duration of a crash event in ways that would make it desirable to change the energy absorbing capacity of the energy absorbing device 20. The present invention is advantageous in that the viscosity of the fluid 50 can be changed within a very short period of time, for example, in a few milliseconds. The sensors 80 and 84 and the controller 60 are operative to sense changing conditions during the crash event and adjust the viscosity of the fluid 50 accordingly during the crash event. As a result, the resistance to collapsing of the steering column 12 can be varied during the duration of the crash event, instead of just once at the onset of the crash event, to adjust the protection being provided to the driver. In addition, the viscosity of the fluid 50 can be controlled during the crash event to provide a desired "ride down" characteristic.

Figure 2:
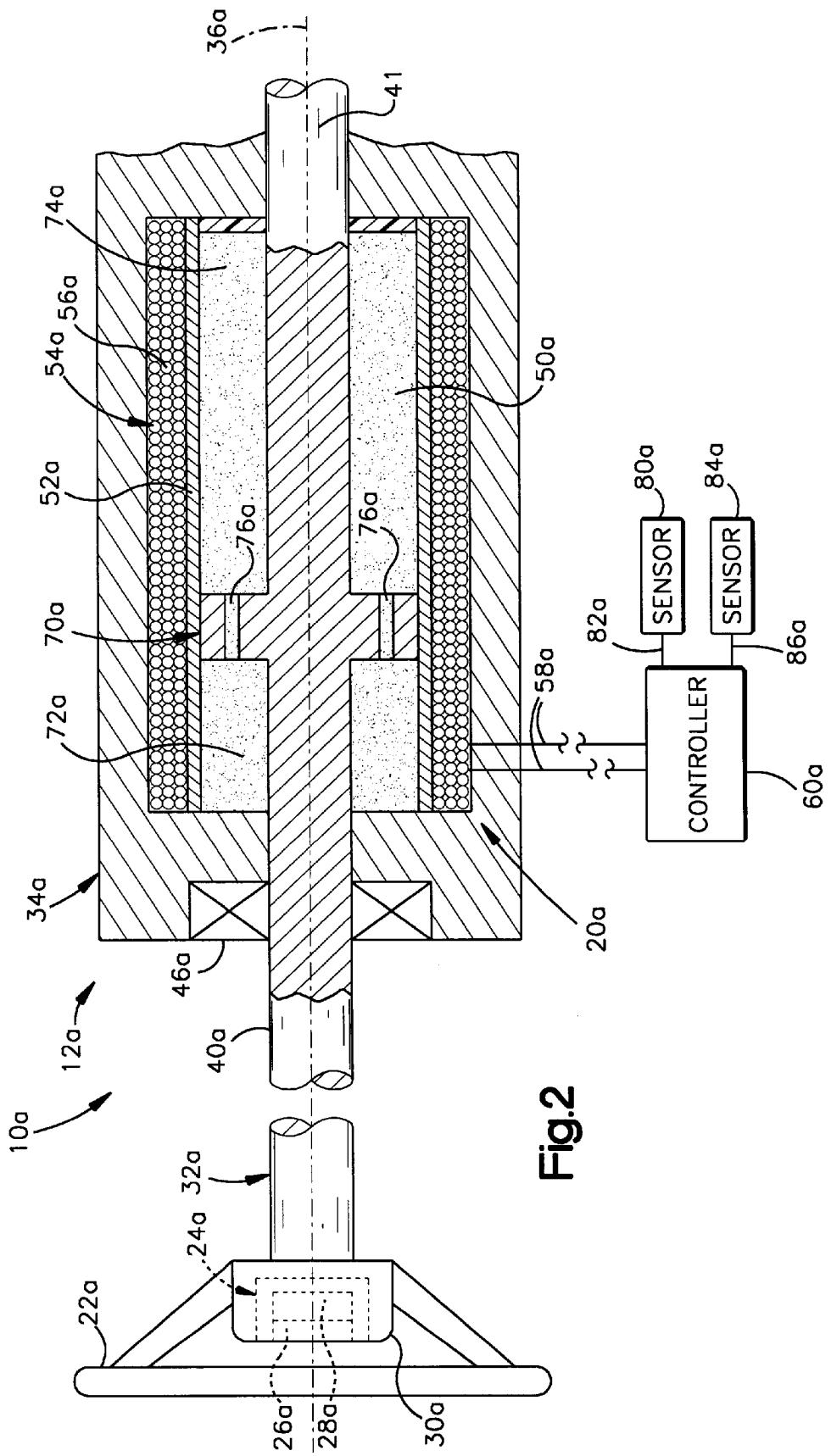
FIG. 2 is a schematic illustration of an apparatus including an energy absorbing device constructed in accordance with as second embodiment of the present invention.

FIG. 2 illustrates schematically a portion of a vehicle 10*a* that includes a steering column 12*a*. The steering column 12*a* is a collapsible steering column that incorporates an energy absorbing device 20*a* in accordance with the invention. The steering column 12*a* is similar in construction to the steering column 12 (FIG. 1), so parts that are the same or similar are given the same reference numerals with the suffix "a" attached.

The vehicle 10*a* does not have a drive by wire steering system. The shaft 40*a* thus extends completely through the fluid cylinder 52*a* and has a projecting portion (shown partially at 41) for transmitting steering torque to the steering system of the vehicle 10*a*. As a result, a portion of the shaft 40*a* is located in and extends through the lower fluid chamber portion 74*a*. The functioning of the energy absorber 50*a* is otherwise similar to that of the energy absorber 50 (FIG. 1).

From the above description of the invention, those skilled in the art will perceive improvements, changes and modifications in the invention. For example, if the fluid used is an electrorheological fluid, then its viscosity is varied by varying an electrical field acting on the fluid, rather than a magnetic field. Such improvements, changes and modifications within the skill of the art are intended to be covered by the appended claims.

Having described the invention, we claim:

1. An apparatus for supporting a steering wheel of a vehicle, said apparatus comprising:
    a first steering column part;
    a second steering column part;
    supporting structure supporting said first steering column part and the vehicle steering wheel for movement relative to said second steering column part; and
    an energy absorbing device interposed between said first steering column part and said second steering column part for resisting movement of said first steering column part relative to said second steering column part, said energy absorbing device comprising:
        a fluid having a viscosity which varies in response to an energy field acting on said fluid;
        at least one orifice through which said fluid flows upon movement of said first steering column part relative to said second steering column part; and
        means for varying the viscosity of said fluid to vary the rate of flow of said fluid through said at least one orifice and thereby to vary the resistance to movement of said first steering column part relative to said second steering column part.

2. An apparatus as set forth in claim 1 wherein said means for varying the viscosity of said fluid comprises a device for generating a magnetic field acting on said fluid, and wherein said fluid is an magneto-rheological fluid whose viscosity varies in response to a change in said magnetic field acting on said fluid.

3. An apparatus as set forth in claim 2 wherein said means for varying the viscosity of said fluid further comprises at least one occupant condition sensor operative to sense an occupant condition and to provide a first output signal, and a controller for receiving said first output signal and for in response controlling said magnetic field to control the resistance to movement of said first steering column part relative to said second steering column part.

4. An apparatus as set forth in claim 2 wherein said device for generating a magnetic field comprises a coil extending around said fluid and a controller for controlling flow of electric current through said coil to vary said magnetic field.

5. An apparatus as set forth in claim 4 wherein said means for varying the viscosity of said fluid further comprises at least one occupant condition sensor operative to sense an occupant condition and to provide a first output signal, and a controller for receiving said first output signal and for in response controlling said magnetic field to control the resistance to movement of said first steering column part relative to said second steering column part.

6. An apparatus as set forth in claim 1 wherein:
    said energy absorbing device includes a chamber containing said fluid;
    said first steering column part comprises a member movable through said chamber upon movement of said first steering column part relative to said second steering column part; and
    said orifice comprises an opening in said movable member through which fluid flows upon movement of said movable member through said chamber.

7. An apparatus as set forth in claim 6 wherein said means for varying the viscosity of said fluid comprises a device for generating a magnetic field acting on said fluid, and wherein said fluid is an magneto-rheological fluid whose viscosity varies in response to a change in said magnetic field acting on said fluid.

8. An apparatus as set forth in claim 7 wherein said means for varying the viscosity of said fluid further comprises at least one occupant condition sensor operative to sense an occupant condition and to provide a first output signal, and a controller for receiving said first output signal and for in response controlling said magnetic field to control the resistance to movement of said piston in said cylinder.

9. An apparatus as set forth in claim 1 wherein said chamber is a cylinder and said movable member is a piston slidable in said cylinder.

10. An apparatus as set forth in claim 9 wherein said first steering column part terminates in said piston.

11. An apparatus as set forth in claim 9 wherein said first steering column part extends past said piston.

12. An apparatus as set forth in claim 1 wherein said means for varying the viscosity of the fluid varies the viscosity of said fluid while said first and second steering column parts are moving relatively.

13. An apparatus for supporting a steering wheel of a vehicle, said apparatus comprising:
    a first steering column part;
    a second steering column part;
    supporting structure supporting said first steering column part and the vehicle steering wheel for movement relative to said second steering column part; and
    an energy absorbing device interposed between said first steering column part and said second steering column part for resisting movement of said first steering column part relative to said second steering column part, said energy absorbing device comprising:
        a fluid having a viscosity which varies in response to an energy field acting on said fluid;
        at least one orifice through which said fluid flows upon movement of said first steering column part relative to said second steering column part; and means for varying the viscosity of said fluid to vary the rate of flow of said fluid through said at least one orifice and thereby to vary the resistance to movement of said first steering column part relative to said second steering column part;

said means for varying the viscosity of said fluid further comprising at least one occupant condition sensor operative to sense an occupant condition and to provide a first output signal, and a controller for receiving said first output signal and for controlling the resistance to movement of said first steering column part relative to said second steering column part in response to said first output signal.

14. An apparatus as set forth in claim 13 wherein said means for varying the viscosity of said fluid comprises a device for generating a magnetic field, and wherein said fluid is an magneto-rheological fluid whose viscosity varies in response to a change in said magnetic field.

15. An apparatus as set forth in claim 14 wherein said device for generating a magnetic field comprises a coil extending around said fluid and wherein said controller controls flow of electric current through said coil to vary said magnetic field.

16. An apparatus as set forth in claim 13 wherein said means for varying the viscosity of said fluid comprises a device for generating an electric field, and wherein said fluid is an electrorheological fluid whose viscosity varies in response to a change in said electric field.

* * * * *